US010012176B2

(12) United States Patent
Todorovic et al.

(10) Patent No.: US 10,012,176 B2
(45) Date of Patent: Jul. 3, 2018

(54) AIRCRAFT GAS TURBINE COMPRISING A THRUST-REVERSER DEVICE WITH CASCADE ELEMENTS AND AN INTEGRATED RACK AND PINION DRIVE

(71) Applicants: Rolls-Royce Deutschland Ltd & Co KG, Blankenfelde-Mahlow (DE); Liebherr-Aerospace Lindenberg GmbH, Lindenberg (DE)

(72) Inventors: Predrag Todorovic, Berlin (DE); Josef Baer, Waltenhofen (DE); Frank Mueller, Lindenberg/Allgaeu (DE); Uwe Schumann, Tettnang (DE)

(73) Assignees: ROLLS-ROYCE DEUTSCHLAND LTD & CO KG, Blankenfelde-Mahlow (DE); LIEBHERR-AEROSPACE LINDENBERG GMBH, Lindenberg (DE)

( * ) Notice: Subject to any disclaimer, the term of this patent is extended or adjusted under 35 U.S.C. 154(b) by 366 days.

(21) Appl. No.: 14/575,643

(22) Filed: Dec. 18, 2014

(65) Prior Publication Data

US 2015/0176529 A1    Jun. 25, 2015

(30) Foreign Application Priority Data

Dec. 19, 2013   (DE) ......................... 10 2013 226 767

(51) Int. Cl.
  *F01K 1/00*   (2006.01)
  *F02K 1/76*   (2006.01)
  (Continued)

(52) U.S. Cl.
  CPC .............. *F02K 1/763* (2013.01); *F02K 1/566* (2013.01); *F02K 1/72* (2013.01); *F05D 2260/53* (2013.01); *Y02T 50/671* (2013.01)

(58) Field of Classification Search
  CPC .................................. F02K 1/76; F02K 1/763
  See application file for complete search history.

(56) References Cited

U.S. PATENT DOCUMENTS 2,570,629 A    10/1951  Anxionnaz et al.
3,500,646 A    3/1970   Hom et al.
(Continued)

FOREIGN PATENT DOCUMENTS

DE  102011008917        7/2012
WO  WO 2013064762 A1 *  5/2013  ............... F02K 1/72

OTHER PUBLICATIONS

Anselmo, Mike, Go long: The pros and cons of rack-and-pinion systems, Feb. 1, 2010, MachineDesign.*

(Continued)

*Primary Examiner* — Pascal M Bui Pho
*Assistant Examiner* — Edwin Kang
(74) *Attorney, Agent, or Firm* — Shuttleworth & Ingersoll, PLC; Timothy J. Klima

(57) ABSTRACT

The present invention relates to an aircraft gas turbine comprising a thrust-reverser device that is arranged at the rear area of an engine cowling and that has multiple cascade elements which are distributed at the circumference and which divert a stream, characterized in that the cascade elements are mounted in a displaceable manner, in that on both sides of each cascade element at least one gear rack is formed that can be displaced via a respective cog wheel which is coupled to a driving device, and in that each cascade element is connected to a rear area of the engine cowling via a coupling element for the purpose of displacing the engine cowling in the axial direction.

5 Claims, 6 Drawing Sheets

Figure 1:
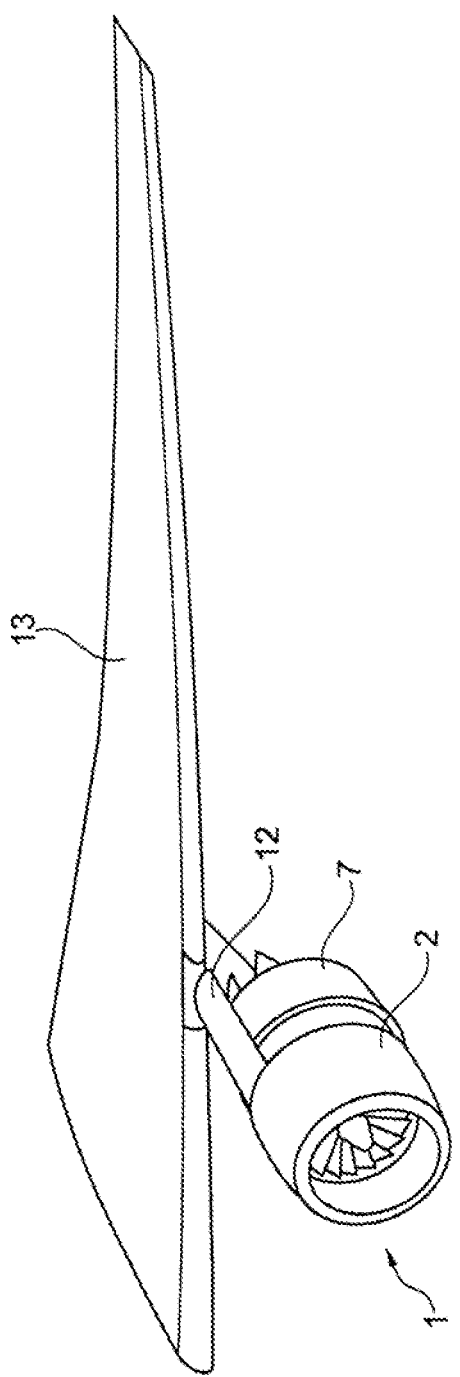

(51) Int. Cl.
*F02K 1/56* (2006.01)
*F02K 1/72* (2006.01)

(56) References Cited

U.S. PATENT DOCUMENTS

| | | | | |
|---|---|---|---|---|
| 3,829,020 | A * | 8/1974 | Stearns | F02K 1/09 181/216 |
| 3,941,313 | A * | 3/1976 | Jumelle | B64C 25/423 239/265.29 |
| 4,005,822 | A | 2/1977 | Timms | |
| 4,297,844 | A * | 11/1981 | Halin | F02K 1/76 417/324 |
| 4,356,973 | A | 11/1982 | Lawson | |
| 4,458,582 | A * | 7/1984 | Linton | F02K 1/76 91/466 |
| 5,209,057 | A | 5/1993 | Remlaoui | |
| 5,211,008 | A | 5/1993 | Fage | |
| 9,016,040 | B2 * | 4/2015 | Stuart | F02K 1/72 60/204 |
| 2002/0125370 | A1 * | 9/2002 | Dehu | F02K 1/72 244/110 B |
| 2010/0001123 | A1 * | 1/2010 | Hillereau | B64D 29/06 244/54 |
| 2010/0139242 | A1 | 6/2010 | Vauchel et al. | |
| 2012/0031995 | A1 * | 2/2012 | Maalioune | B64D 33/04 239/265.19 |
| 2012/0138707 | A1 * | 6/2012 | Vauchel | F02K 1/763 239/265.29 |
| 2013/0062433 | A1 | 3/2013 | Vauchel et al. | |
| 2013/0306755 | A1 * | 11/2013 | Dittmann | F02K 1/1207 239/265.25 |
| 2013/0318945 | A1 | 12/2013 | Todorovic | |
| 2014/0230584 | A1 * | 8/2014 | Hudson | F02K 1/763 74/89.23 |
| 2015/0285185 | A1 * | 10/2015 | Caruel | F02K 1/72 415/146 |

OTHER PUBLICATIONS

European Search Report dated May 8, 2015 for related European patent application No. 14194730.9.
German Search Report dated Mar. 28, 2014 from counterpart App No. 10 2013 226 767.3.

* cited by examiner

AIRCRAFT GAS TURBINE COMPRISING A THRUST-REVERSER DEVICE WITH CASCADE ELEMENTS AND AN INTEGRATED RACK AND PINION DRIVE

The invention relates to an aircraft gas turbine.

In particular, the invention relates to an aircraft gas turbine having a thrust-reverser device that is arranged in the rear area of an engine cowling and that comprises multiple petal cascade elements that are distributed at the circumference and that divert a stream.

Various embodiments of thrust-reverser devices are known from the state of the art in which cascade elements or doors can be displaced or pivoted. Here, the individual elements are mounted with friction bearings, respectively, which cause a sliding longitudinal translation along the rails or the guide elements. Such shifting mechanisms with slide elements have the disadvantage that they have a considerable friction, so that strong reaction forces occur.

According to the basic principles as they are known from the state of the art, at first the rear area of the engine cowling is translated in order to create a clearance that is substantially ring-shaped and into which the thrust reverser doors can then be pivoted. Such structures are shown in US 2010/0139242 A1, U.S. Pat. No. 4,356,973 or U.S. Pat. No. 5,209,057 A, for example. As can be seen here, the drive device is used for the purpose of translation of the rear area of the engine cowling. Already at this point, the problems associated with jamming due to different frictions and/or different loads, as they have been mentioned above, occur. Therefore, in order to maintain the functionality, it is necessary to design the overall structure so as to render it very sturdy, and also to provide for the tolerances to be low during the manufacturing process. All this leads to high production-technical expenditures, increased weight and high costs.

Moreover, in the structures that are known from the state of the art, it is necessary to take measures to ensure the steady displacement of the rear area of the engine cowling as well as the steady actuation of thrust reverser doors. This, too, results in a high expenditure with respect to the necessary devices.

The invention is based on the objective to create a thrust-reverser device (petal cascades TRU type) that is arranged inside an aircraft gas turbine, and in which the disadvantages of the state of the art are avoided and an operationally safe actuation is ensured, while also allowing for a simple assembly and easy, cost-effective manufacturability.

Therefore, the solution according to the invention is based on the principle of using a rack and pinion drive in order to actuate the cascade elements. By means of such a rack and pinion drive it may be ensured that all of the cascade elements can be actuated in the same way. By providing a coupling between a drive unit and the gear racks and the associated cog wheels any jamming of the drive unit as a whole and/or any displacement or movement of individual cascade elements in a different manner is avoided. (The driving force lies in the same line as the displacement mechanism). Hereby, operational safety is substantially increased. Moreover, it becomes possible to dispense with redundant driving means or monitoring measures.

The basic principle according to the invention further provides that the petal cascade elements displace the rear area of the engine cowling as a result of their movement (shifting and/or pivoting). Thus, a kinematically different solution principle has been developed as compared to the state of the art, in which the rear area of the engine cowling is displaced and, independently of this displacement, petal cascade elements or thrust reverser doors are pivoted or actuated. Hereby, too, a simplified functionality and a high level of operational safety is achieved according to the invention.

In particular, it is provided according to the invention that the petal cascade elements are mounted in an displaceable manner, that on one or on both sides of each petal cascade element a gear rack is formed, which is connected via a respective pinion that is coupled to a driving device, which are rotatable, and that each petal cascade element is connected via at least one coupling element to a rear area of the engine cowling for the purpose of displacing it in the axial direction.

Since according to the invention at least one gear rack is arranged, respectively, on both circumferential lateral areas of the petal cascade elements, and since the respective pinions are rotated in a manner synchronized with each other by means of one single driving device (motor), the result is a deadlock-free sequence of movements of the petal cascade elements. Alternatively, it is also possible to provide two gear racks. The coupling of the petal cascade elements with the rear area of the engine cowling by means of coupling elements leads to an operationally safe displacement of the rear area of the engine cowling.

In order to displace the petal cascade elements and to transfer them from a non-actuating position into a thrust-reverse position, the gear racks can be embodied either as having a straight or a curved shape. The term "displacement of the petal cascade elements" can thus comprise both a linear translation and a displacement along a curved trajectory.

In a particularly advantageous embodiment of the invention it is provided that the drive shafts are connected to each other via cardan joints. Hereby, a synchronized rotation is ensured. Further, it is particularly advantageous when the drive shafts and the motor form a closed drive ring that extends around the circumference of the engine cowling or of the engine.

For the purpose of improving the driving performance, it can be advantageous when the motor is embodied as a gear motor. Moreover, the pinions can comprise one gearbox (planetary/epicyclic), respectively, so that the circumferential speed of the pinion's gearing is lower than the rotational speed of the drive shafts.

As an alternative to the drive shafts, which are connected with each other by means of cardan joints, there is also the possibility to use and actuate in a synchronized electronic manner multiple electric motors (stepper motors) with an integrated planetary gearbox as individual units per each petal cascade.

The gear racks of the respective petal cascade element according to the invention are preferably formed as an integral part of the petal cascade element, preferably during the overall production process of the petal cascade elements.

It is particularly advantageous when a central drive unit (motor) is equipped with at least one brake. Thus, through the solution according to the invention, what results is an overall structure that has a lower weight, that can be manufactured cost-effectively and that facilitates a safely operable actuation of the thrust-reverser device while also avoiding the danger of jamming.

It shall be understood that it is also possible to provide multiple motors that are distributed around the circumference and that are coupled with the drive shafts and also with each other. What is important here is that the result is a self-contained, circular drive train.

In the following, the invention is described by way of an exemplary embodiment in connection with the drawings. In the Figures:

FIG. 1 shows a partial perspective view of an aircraft gas turbine according to the invention which is mounted on a wing of an aircraft.

Figure 2:
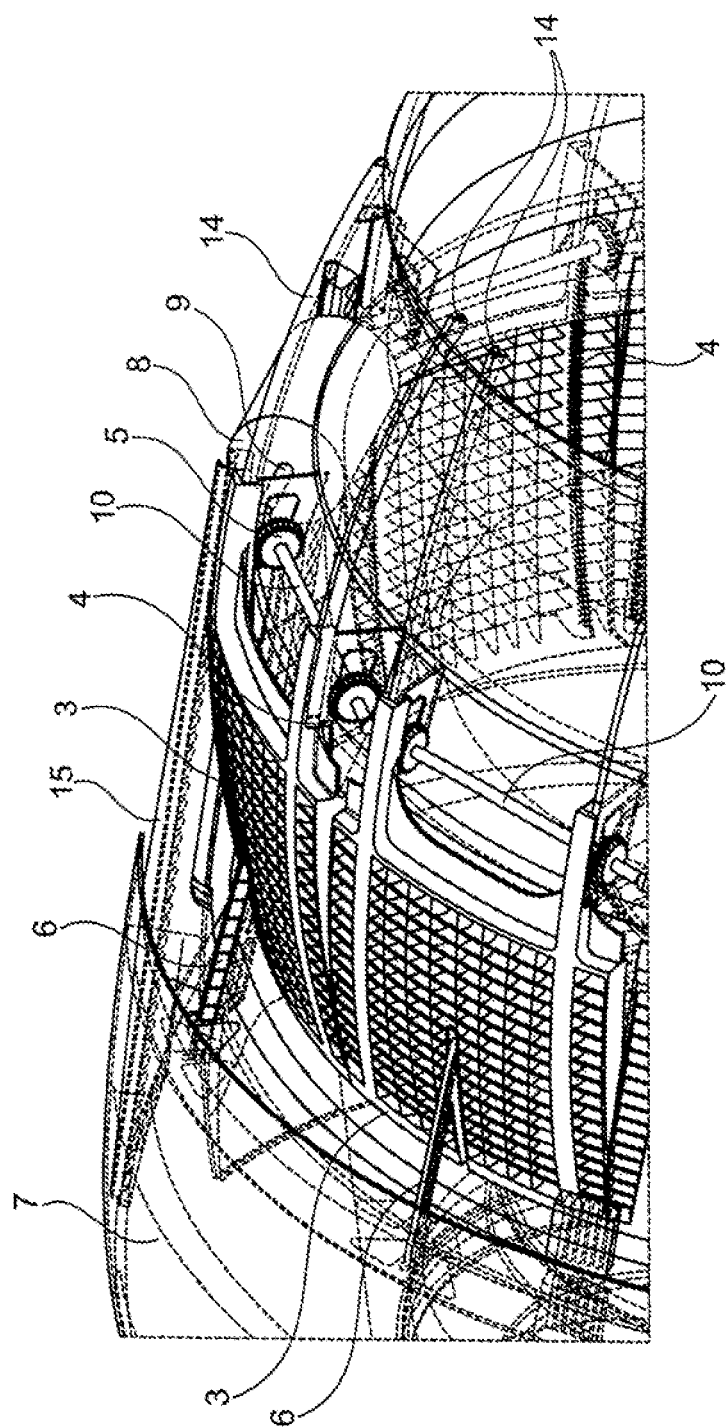
Figure 3:
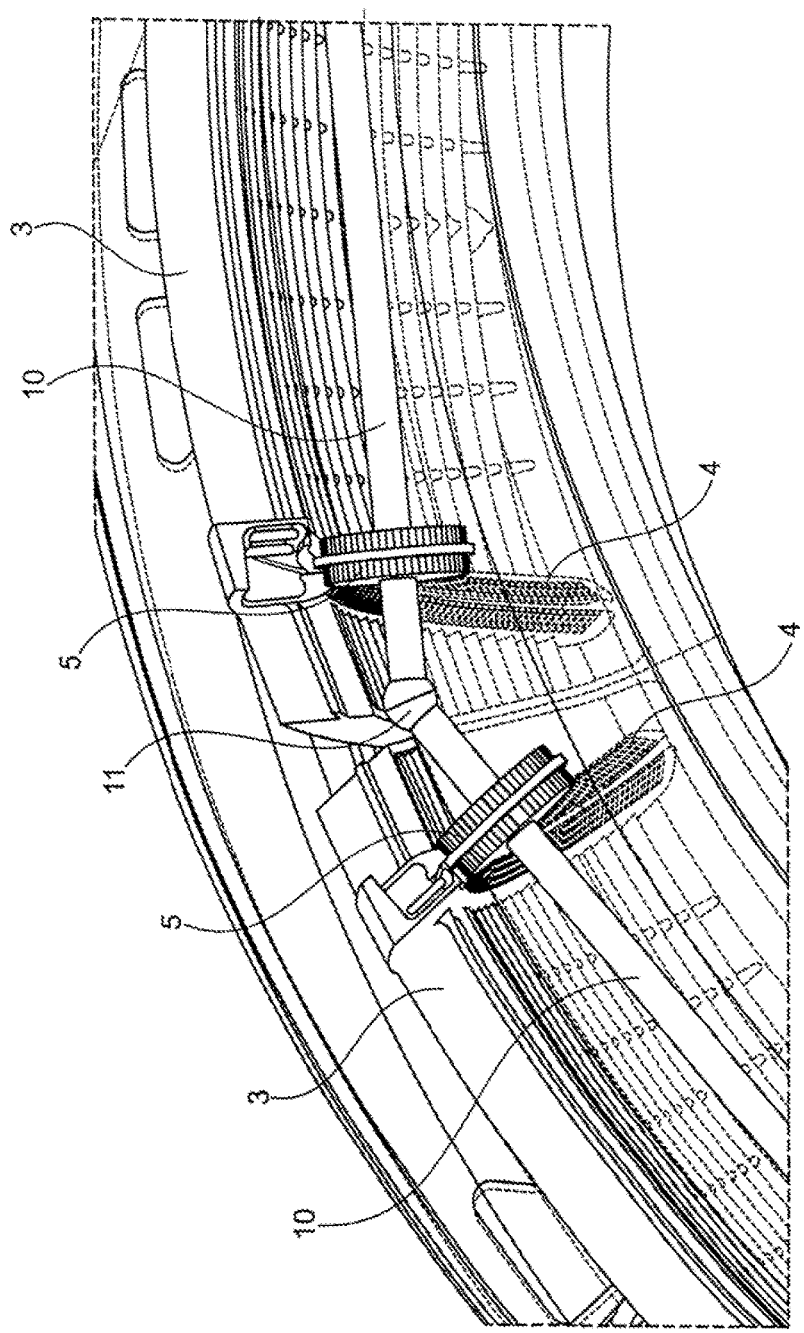
Figure 4:
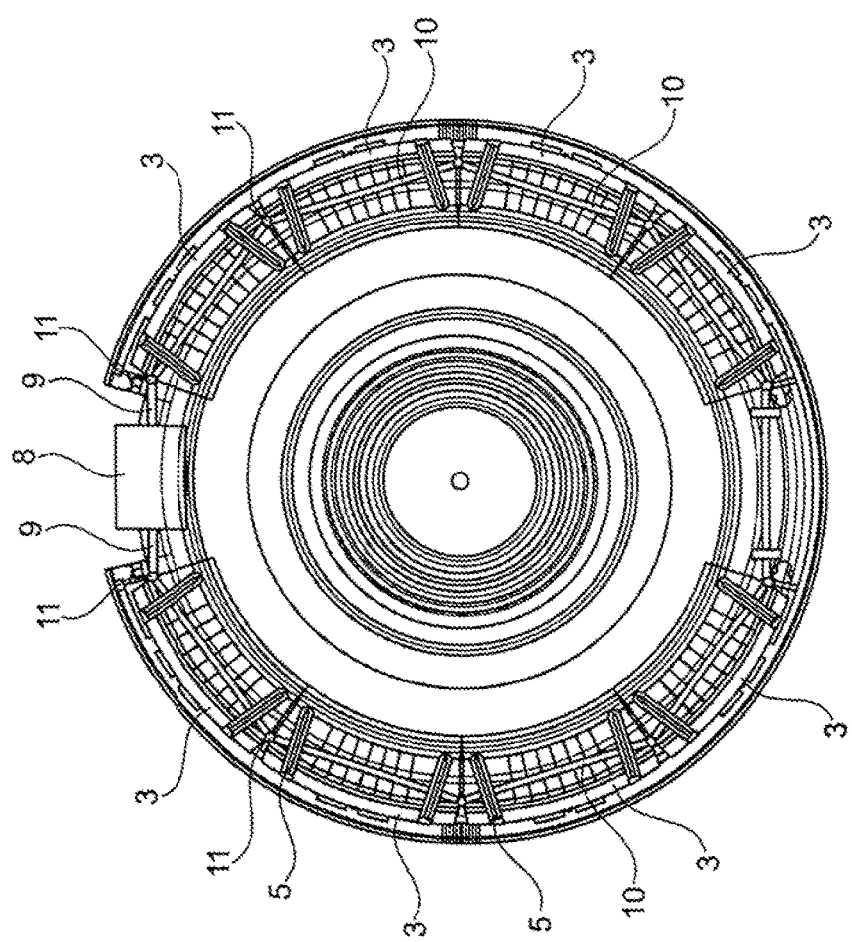
Figure 5:
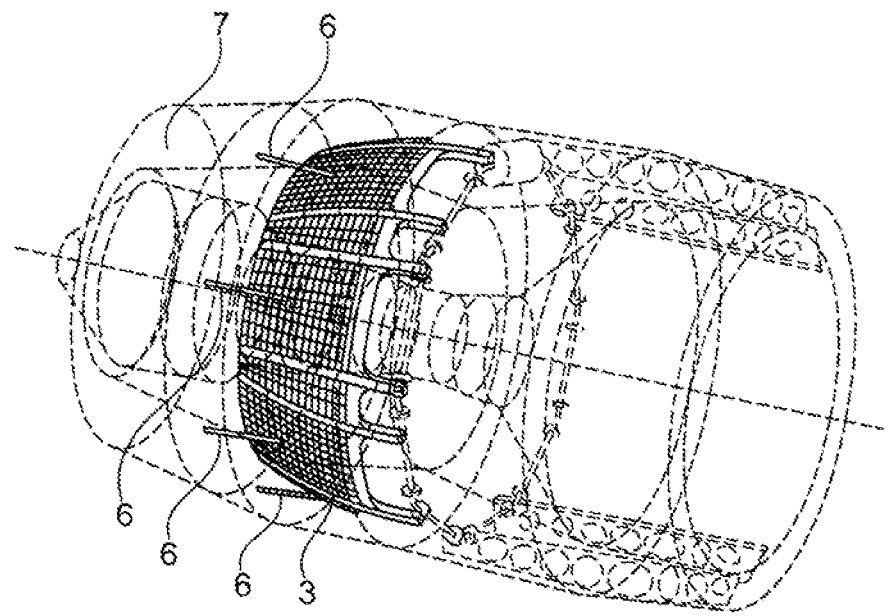
Figure 6:
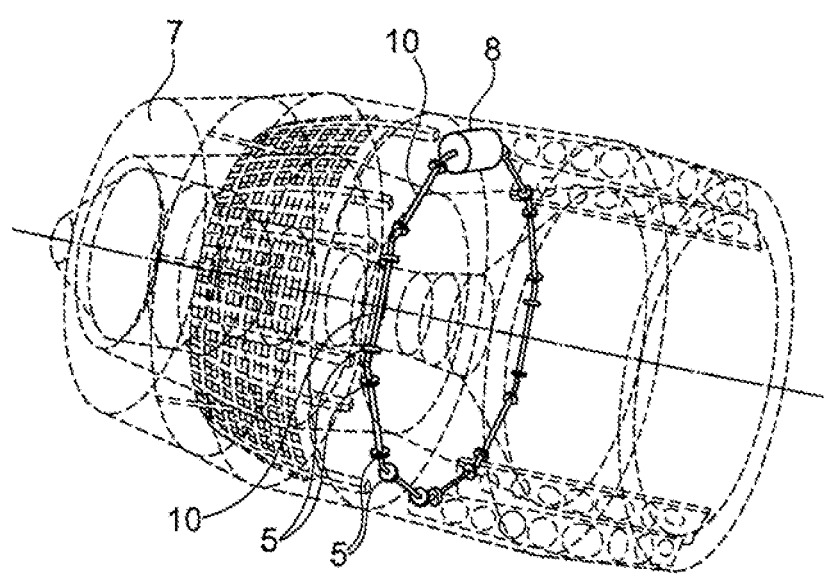
Figure 7:
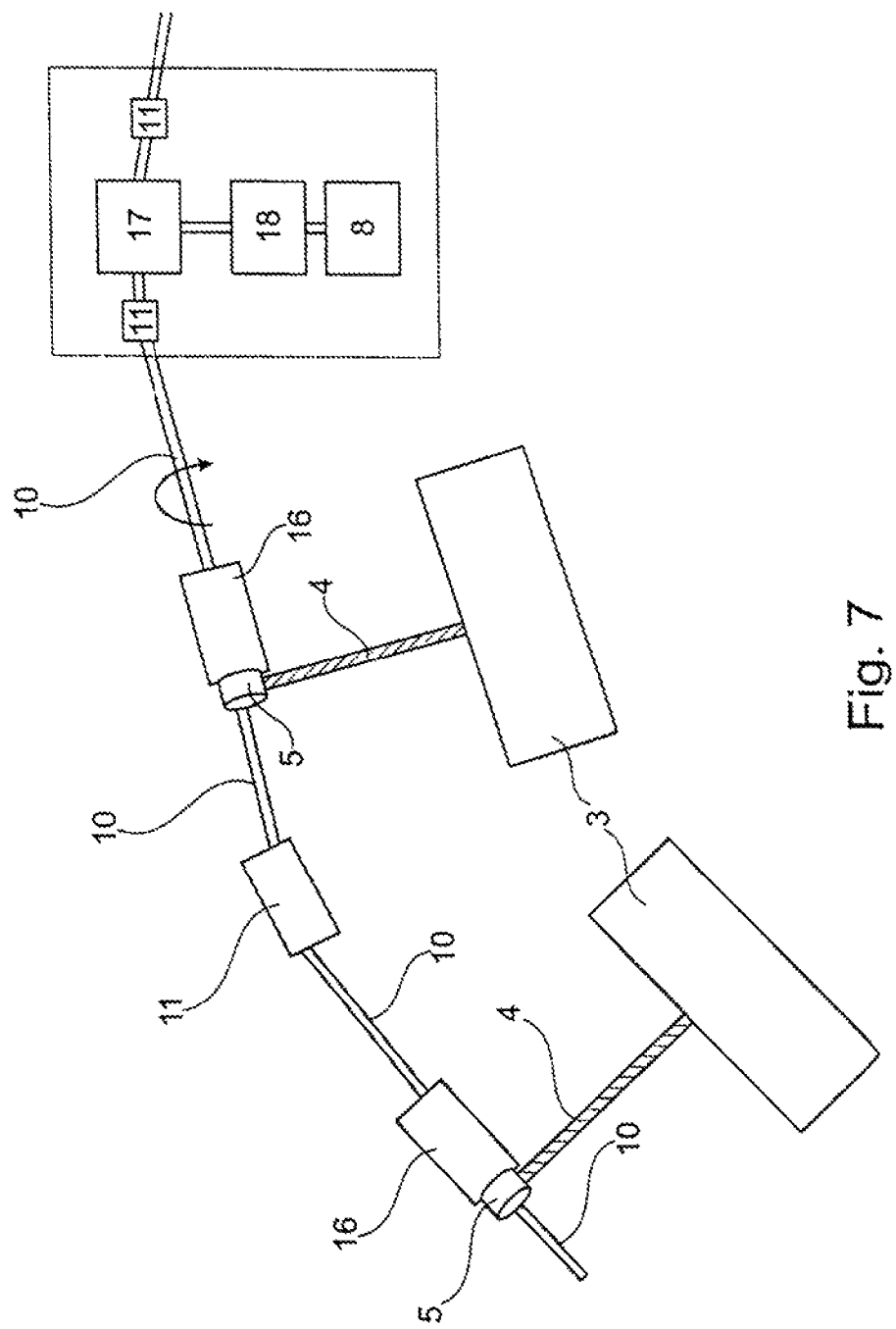

FIG. 2 shows a partial perspective view of the petal cascade elements according to the invention, including the associated driving device, FIG. 3 shows an enlarged detailed view of two petal cascade elements with racks and pinions, as well as drive shafts, FIG. 4 shows a sectional front view of the exemplary embodiment according to the invention, FIG. 5 shows a partial perspective view as a representation of the petal cascade elements, FIG. 6 shows a view, analogous to FIG. 5, representing the closed drive train, and FIG. 7 shows a schematic representation of the construction according to the invention.

FIG. 1 shows an aircraft gas turbine 1 which is provided with an engine cowling 2 in the customary manner. The engine cowling 2 has a rear area 7, which is translatable in the axial direction, with respect to the engine axis, for the purpose of thrust-reverse. The gas turbine 1 is suspended at a wing 13 by means of a pylon 12, such as is known from the state of the art.

FIGS. 2 and 3 show petal cascade elements 3 in a perspective representation, respectively. The petal cascade elements 3 comprise a plurality of transverse baffles which are not shown in detail and through which air from the bypass duct is redirected for the purpose of thrust-reverse. Such petal cascade elements 3 are known from the state of the art.

The petal cascade elements 3 are mounted at their lateral areas on guide rails 14, respectively. These can be formed with a linear or a curved shape. Moreover, the petal cascade elements 3 have gear racks 4 at their lateral areas that comb with the pinions 5. As is shown in FIG. 3, for example, the gear rack 4 can be formed in a double-sided manner, so that the pinion 5 combs with the double-sided gearing with the gear rack 4.

The pinions 5 are mounted in a torque-proof manner on drive shafts 10, respectively. The individual drive shafts 10 are connected in a torque-proof manner via cardan joints, bevel gear wheels, constant velocity joints or angular gears 11, which form a deflection device, so that a substantially circular, closed drive train is formed, as shown in FIG. 4. This drive train comprises a motor 8, which can be embodied as a hydraulic motor or as an electric motor and may also comprise a gear unit and which forms a central drive unit. The two lateral output shafts 9 of the motor 8 are connected to the neighbouring drive shafts 10 via cardan joints 11, as well.

According to the invention, the motor 8 thus drives the individual drive shafts 10 and the pinions 5 that are coupled with the same in order to displace the petal cascade elements 3 which are arranged so as to extend around the circumference (see FIG. 5).

The petal cascade elements 3 are respectively connected to the rear area 7 of the engine cowling 2 by means of coupling elements 6, as shown in FIGS. 2 and 5, for example. The rear area 7 of the engine cowling 2 is mounted on rails 15, which are not shown in detail, so that the rear area 7 can be displaced in the axial direction. Thus, actuation of the motor 8 does not only lead to a permanently coupled and steady movement of the individual petal cascade elements, but also results in the axial translation of the rear area of the engine cowling.

FIG. 7 shows a schematic representation of the exemplary embodiment according to the FIGS. 2 to 6. Here, it is particularly illustrated once more that the motor 8 is equipped with a gear unit 17 via a brake 18, with the gear unit 17 having output shafts that are respectively connected to a deflection device 11. Moreover, the gear unit 16 that has already been mentioned and that is associated with the cog wheel 5 or integrated into the same is shown in a schematic manner. The rotational speed of the motor can be less than 6000 1/min, the torque can be less than 300 Nm. The drive shafts 10 can be formed as solid shafts, as chains, as flex shafts, as a sprocket wheel or as a toothed belt.

LIST OF REFERENCES 1 aircraft gas turbine
2 engine cowling
3 petal cascade element
4 gear rack
5 pinion
6 coupling element
7 rear area
8 motor (central drive unit)
9 output shaft
10 drive shaft
11 cardan joint/angular gears/deflection device
12 pylon
13 wing
14 guide rail
15 rail
16 gear unit
17 gear unit
18 break

The invention claimed is:
1. An aircraft gas turbine comprising:
an engine cowling;
a thrust-reverser device arranged at a rear area of the engine cowling, the thrust-reverser device including a plurality of cascade elements distributed around a first circumference of the aircraft gas turbine that diverts a stream;
a driving device;
a pair of gear racks of a plurality of gear racks, a first gear rack of the pair of gear racks positioned on a first side of a cascade element of the plurality of cascade elements, and a second gear rack of the pair of gear racks positioned on a second side of the cascade element of the plurality of cascade elements;
a respective pinion of a plurality of pinions respectively coupling each gear rack of the pair of gear racks of the plurality of gear racks to the driving device for mounting each cascade element of the plurality of cascade elements in a displaceable manner;
at least one coupling element respectively connecting each cascade element of the plurality of cascade elements to the rear area of the engine cowling for displacing the engine cowling in an axial direction;
wherein the driving device comprises a central drive unit, the central drive unit includes an output shaft connected to multiple drive shafts, a plurality of deflection devices connecting the multiple drive shafts to each other in a torque-proof manner, two pinions of the plurality of pinions being attached to a respective drive shaft of the multiple drive shafts;

wherein each drive shaft of the multiple drive shafts is straight;

wherein the plurality of deflection devices are selected from the group consisting of cardan joints, bevel gear wheels, constant velocity joints, and angular gears;

wherein the multiple drive shafts, the plurality of deflection devices, and the central drive unit form a closed drive ring which extends around a second circumference of the engine cowling.

2. The aircraft gas turbine according to claim 1, and further comprising a gear unit of a plurality of gear units respectively coupling each pinion of the two pinions to the respective drive shaft.

3. The aircraft gas turbine according to claim 2, wherein the gear unit of the plurality of gear units is a planetary gear integrated, respectively, into each pinion of the two pinions.

4. The aircraft gas turbine according claim 1, wherein the central drive unit comprises a gear unit.

5. The aircraft gas turbine according to claim 1, wherein the plurality of gear racks are formed to have a straight shape or a curved shape.

* * * * *